United States Patent
Schroeder et al.

(10) Patent No.: US 6,566,867 B1
(45) Date of Patent: May 20, 2003

(54) BINARY ENCODED CRANKSHAFT TARGET WHEEL WITH SINGLE VR SENSOR

(75) Inventors: Thaddeus Schroeder, Rochester Hills, MI (US); Bruno Patrice Bernard Lequesne, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/339,699

(22) Filed: Jun. 24, 1999

(51) Int. Cl.$^7$ ................................................ G01B 7/14
(52) U.S. Cl. ........................ 324/207.22; 324/207.25; 341/15
(58) Field of Search ................ 324/207.2, 207.21, 324/207.22, 207.25, 173, 174; 123/617; 341/15

(56) References Cited

U.S. PATENT DOCUMENTS

| | | | | |
|---|---|---|---|---|
| 4,072,893 A | * | 2/1978 | Huwyler | 324/207.25 |
| 4,142,153 A | * | 2/1979 | Smith | 324/166 |
| 4,180,753 A | * | 12/1979 | Cook, II | 324/207.22 |
| 5,670,886 A | * | 9/1997 | Wolff et al. | 324/207.2 |
| 5,869,962 A | * | 2/1999 | Kasumi et al. | 324/207.21 |

* cited by examiner

*Primary Examiner*—Walter E. Snow
(74) *Attorney, Agent, or Firm*—Margaret A. Dobrowitsky

(57) ABSTRACT

In an angle-based binary encoded crankshaft position sensing system, a target wheel is coupled to a crankshaft and a single VR sensor is juxtaposed with the target wheel for sensing the angular position of the wheel and, hence, the angular position of the crankshaft. To permit the use of a single VR sensor in conjunction with an angle-based binary encoded system, the periphery of the target wheel is formed with teeth and slots defining a binary pattern. The slots are wider than the teeth, and the depth of the slots relative to the portion of the periphery defining a nominal radius is greater than the height of the teeth relative to the nominal periphery. With this structure, the signal generated by the sensor in response to a slot advantageously is symmetric to the signal generated by the sensor in response to a tooth.

16 Claims, 3 Drawing Sheets

VR SENSOR CIRCUIT

DUAL ELEMENT MR SENSOR CIRCUIT

SINGLE ELEMENT MR SENSOR CIRCUIT

BINARY ENCODED CRANKSHAFT TARGET WHEEL WITH SINGLE VR SENSOR

TECHNICAL FIELD

The present invention relates generally to crankshaft target wheels, and more particularly to binary encoded crankshaft target wheels that require only a single variable reluctance (VR) sensor but that are useful with more than one VR sensor or one or more magnetostatic sensors.

BACKGROUND OF THE INVENTION

A binary coded target wheel is a disk that is engaged with a vehicle crankshaft and that is configured for inducing signals in one or more sensors positioned next to the target wheel, with the signals representing the angular position of the crankshaft to provide for fast identification of the absolute angular position of the crankshaft within, e.g., one quarter of a revolution. These position signals can be used in distributorless ignition systems that have selectively energized ignition coils that fire the spark plugs as appropriate for the angular position of the crankshaft. Moreover, the crankshaft angular position signals can be used for combustion control and diagnostic functions.

Examples of target wheels including the purpose and designs for binary encoding are set forth in, e.g., U.S. Pat. Nos. 5,570,016 and 5,731,702. Essentially, the edge of the disk-shaped wheel is varied along the periphery of the wheel in some fashion, e.g., by cutting slots in the periphery in a predetermined pattern. Usually, two sensors are used to detect the slots as they pass by the sensors, with the detected slot pattern being correlated to a crankshaft angular position.

Two sensing schemes can be used. In the first, referred to as "time-based", each position signal pulse that is generated is actually two pulses that are spaced from each other, depending on the angular position of the wheel, in a long-short pattern or short-long pattern. Unfortunately, time-based crankshaft position systems suffer from the drawback that crankshaft rotational speed and acceleration must be accounted for, which complicates such systems and increases their cost.

Accordingly, a second sensing scheme has been developed, referred to as "angle-based", that is unaffected by crankshaft speed and acceleration. In angle-based systems, either two VR sensors or two magnetostatic sensors have been required to sense the binary pattern established by the slots. Unfortunately, using two sensors instead of one increases the cost and complexity of such systems. Moreover, in angle-based systems VR system wheels are not appropriately configured for magnetostatic sensor systems, and vice-versa, requiring duplicative design and production costs. The present invention has recognized the above-noted problems and has provided the below solutions to one or more of the prior art drawbacks.

SUMMARY OF THE INVENTION

A target wheel for ascertaining the angular position of a crankshaft includes a wheel body that has a periphery defining a nominal radial surface. The nominal radial surface is characterized by a nominal wheel radius. Moreover, the periphery of the wheel is formed with plural slot radial surfaces, each being characterized by a slot radius that is less than the nominal wheel radius. Further, the periphery of the wheel is formed with plural tooth radial surfaces. Each tooth radial surface is characterized by a tooth radius that is greater than the nominal wheel radius.

Preferably, each slot defines a slot angular width and each tooth defines a tooth angular width, and the slot angular width is larger than the tooth angular width. Additionally, each slot defines a slot radial depth relative to the nominal wheel radius and each tooth defines a tooth radial height relative to the nominal radius, and the slot radial depth is larger than the tooth radial height. In other words, to achieve magnetic symmetry between slots and teeth the slots are larger than the teeth. The wheel can be used in combination with at least one sensor in the group of sensors consisting of VR sensors, magnetostatic sensors, preferably such as Indium-Antimony (InSb) magnetoresistor (MR) sensors, and Hall effect sensors.

In another aspect, an angular-based crankshaft position sensing system includes a target wheel having a periphery that defines a binary pattern, and one and only one VR sensor is juxtaposed with the target wheel and is responsive to the binary pattern to generate a signal representative of the position of the target wheel.

In still another aspect, a crankshaft target wheel includes a wheel body having a nominal periphery. Plural teeth rise from the nominal periphery and plural slots fall from the nominal periphery.

The details of the present invention, both as to its structure and operation, can best be understood in reference to the accompanying drawings, in which like reference numerals refer to like parts, and in which:

DESCRIPTION OF THE PREFERRED EMBODIMENT

Figure 1:
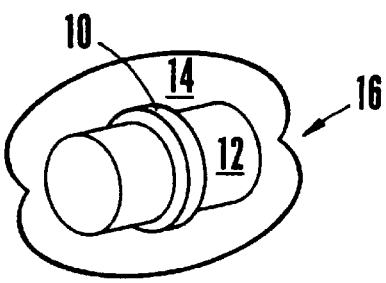
FIG. 1 is a schematic view of the present target wheel engaged with a crankshaft of an engine.

Referring initially to FIG. 1, a target wheel 10 is shown in operative engagement with a crankshaft 12 of an engine 14 in a vehicle, generally designated 16. As set forth further below, the target wheel 10 can be used with one or two VR or MR sensors, more preferably with a single VR sensor, to sense the angular position of the crankshaft 12 relative to the engine 14 and to perform binary decoding without accounting for the speed or acceleration of the crankshaft 12. Hence, the preferred system is an angle-based system, although the principles of the present invention regarding the configuration of the target wheel 10 can be applied to time-based systems. Moreover, although intended for crankshaft position applications, the present invention can be used to generate signals representative of the angular position of rotating shafts other than crankshafts, without having to account for the speed and acceleration of the shafts.

Figure 2:
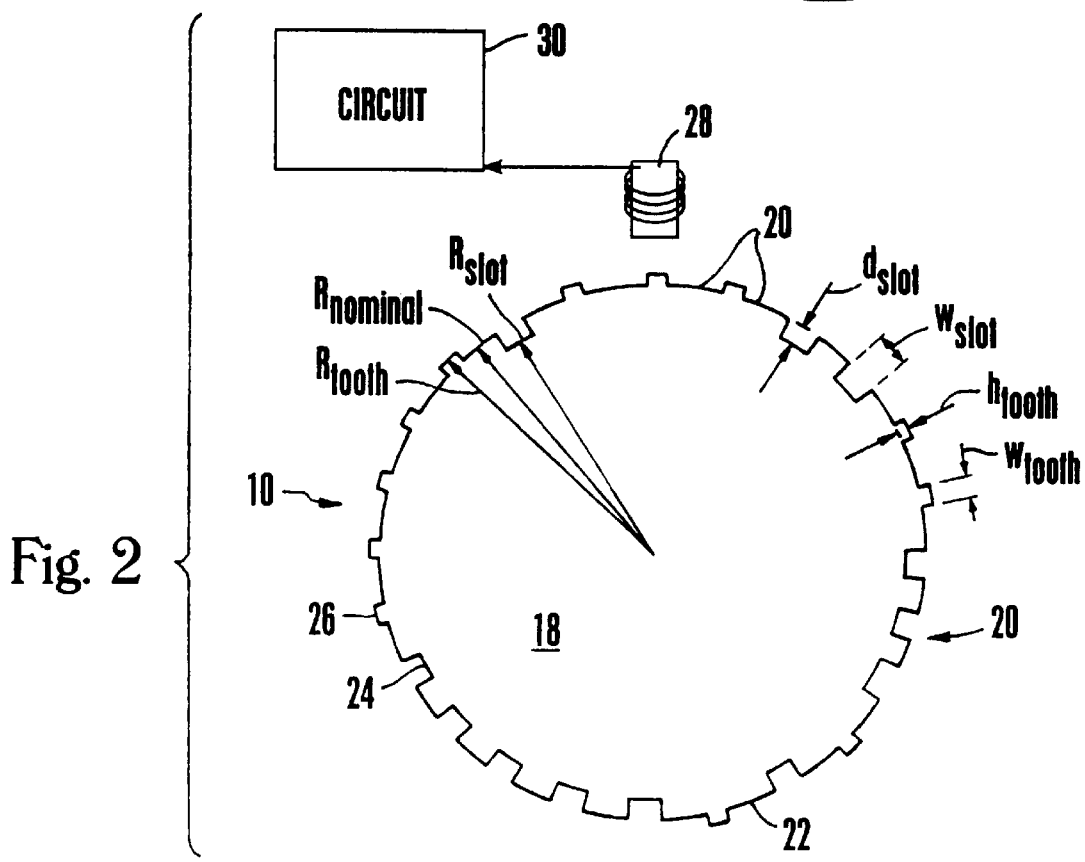
FIG. 2 is a schematic plan view of the present target wheel in juxtaposition with a single VR sensor.

Now referring to FIG. 2, the target wheel 10 includes a generally disk-shaped wheel body 18 having a periphery, generally designated 20. As can be appreciated in reference to FIG. 2, the periphery 20 in turn defines arc-shaped nominal radial surfaces 22 that are characterized by a nominal wheel radius $R_{nominal}$. Also, the periphery 20 defines plural arc-shaped slot radial surfaces 24, each being characterized by a slot radius $R_{slot}$ that is less than the nominal wheel radius $R_{nominal}$. Moreover, the periphery 20 includes plural arc-shaped tooth radial surfaces 26. As shown in FIG. 2, each tooth radial surface 26 is characterized by a tooth radius $R_{tooth}$ that is greater than the nominal wheel radius $R_{nominal}$. Powder metal techniques, or blank forming techniques, or even machining can be used to make the wheel 10.

In accordance with the present invention, the slot radial surfaces 24 and tooth radial surfaces 26 are disposed around the periphery 20 in a binary pattern. In one preferred embodiment, the binary pattern established by the surfaces 24, 26 can be similar or identical to the pattern disclosed in U.S. Pat. No. 5,731,702, incorporated herein by reference.

As understood by the present invention, to simplify the electrical circuit that processes the position signals as more fully set forth below, except for polarity differences the signal generated in response to a slot 24 preferably is symmetric to (i.e., has about the same waveform and amplitude as) the signal generated in response to a tooth 26. As further recognized herein, such symmetry can be achieved by establishing magnetic symmetry between the slots 24 and teeth 26. Per the present invention, magnetic symmetry between slots 24 and teeth 26 is promoted by establishing the teeth 26 to be smaller and narrower than the slots 24.

More particularly, each slot 24 defines a slot angular width $W_{slot}$ and each tooth 26 defines a tooth angular width $W_{tooth}$, and the slot angular width $W_{slot}$ is larger than the tooth angular width $W_{tooth}$. Further, each slot 24 defines a slot radial depth $d_{slot}$ relative to the nominal wheel radius $R_{nominal}$ and each tooth defines a tooth radial height $h_{tooth}$ relative to the nominal radius $R_{nominal}$, with the slot radial depth $d_{slot}$ being larger than the tooth radial height $h_{tooth}$. In one preferred embodiment, the slot radial depth $d_{slot}$ is on the order of two to three millimeters (2 mm–3 mm), and tooth radial height $h_{tooth}$ is less than one millimeter (1 mm).

In the embodiment shown in FIG. 2, a binary pattern magnetic field sensor 28 is closely juxtaposed with the target wheel 10 to sense the passage of slots 24 and teeth 26 beneath the sensor 28. Indium-Antimony (InSb) magnetoresistors are preferred, but other sensors, e.g., Hall sensors or other magnetoresistors, may be used.

In the preferred embodiment, one and only one sensor 28 is provided, to reduce the cost and complexity of the present system. Such a simplified configuration is made possible owing to the present combination of structure. In a particularly preferred embodiment, the sensor 28 is a VR sensor. FIG. 2 shows that the sensor 28 is electrically connected to an analog or digital signal processing circuit 30 that processes the signals from the sensor 28 in accordance with principles set forth below.

Figure 3:
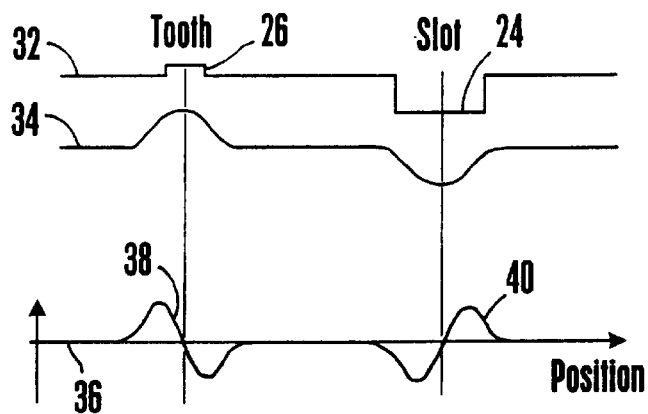
FIG. 3 is a graph of the signals generated by the sensor shown in FIG. 2, as a function of target wheel angular position.

FIG. 3 illustrates the signals that are generated by the sensor 28. The top graph line 32 in FIG. 3 represents the periphery 20 by showing a single slot 24 followed by a single tooth 26, as labelled in FIG. 3. The second graph line 34 in FIG. 3 illustrates the respective magnetic fields sensed by the sensor 28 (when the sensor 28 is a VR sensor) as the slot 24 and tooth 26 pass the sensor 28. As shown, these fields advantageously are symmetric when the principles herein are implemented.

For VR sensors, the signal that is output represents the time rate of change of the magnetic field. Accordingly, the third graph line 36 in FIG. 3 shows the waveforms 38, 40 that are output by the sensor 28 when the tooth 26 and slot 24 are sensed, respectively. As shown, the signals 38, 40 are sinusoidal waves that are symmetric to each other, with the tooth signal 38 being positive in the first half and negative in the second, and the slot signal 40 being negative in the first half and positive in the second. The position information is detected at the zero crossings of the signals. With the above in mind, the circuit 30 (FIG. 2) outputs a binary zero (or one) when a waveform is encountered that is first positive and then negative, indicating a tooth 26, whereas the circuit 30 outputs a binary one (or zero) when a waveform is encountered that is first negative and then positive, indicating a slot 24. The pattern of zeroes and ones output by the circuit 30 depend on the binary pattern of the wheel 10 and, hence, represent the angular position of the wheel 10.

Figure 4:
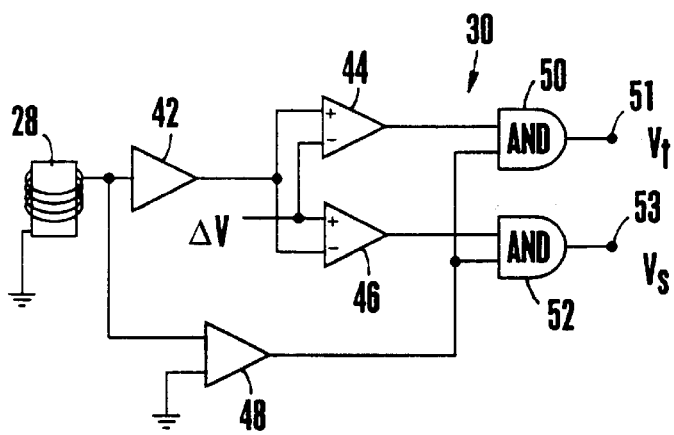
FIG. 4 is a schematic diagram of the electrical circuit used by the system shown in FIG. 2.

FIG. 4 shows one example of the circuit 30. The sensor 28 sends its signal to an integrator 42, which outputs a signal representing the integral of the signal from the sensor 28. Tooth and slot comparators 44, 46 compare the integrated signal from the integrator 42 to a predetermined $+\Delta V$ signal and $-\Delta V$ signal, respectively, to generate square wave windows respectively representative of teeth and slots.

Additionally, a zero crossing detector 48 receives the signal from the sensor 28 and outputs a square wave signal that is non-zero when the input signal is positive and that is zero when the input signal is zero or negative. As shown in FIG. 4, an AND gate 50 combines (ANDs) the output of the zero crossing detector 48 and the tooth comparator 44 to output, at pin 51, a tooth signal $V_t$ representative of the position of a tooth, as indicated by the zero crossing signal. Likewise, an AND gate 52 combines (ANDs) the output of the zero crossing detector 48 and the slot comparator 46 to output, at pin 53, a slot signal $V_s$ representative of the position of a slot, as indicated by the zero crossing signal. The tooth and slot signals $V_t$, $V_s$ can be further processed by either hardware or software, e.g., by a powertrain electronic control module.

Figure 5:
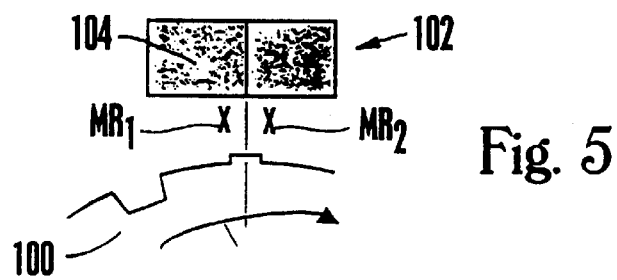
FIG. 5 is a schematic plan view of an alternate system showing a portion of a target wheel in juxtaposition with a dual-element MR sensor.

FIG. 5 shows that a wheel 100, which in all essential respects identical to the wheel 10 shown in FIG. 2, can be used in conjunction with a dual-element MR sensor 102 having a magnet 104 and first and second MR elements $MR_1$, $MR_2$. The signal generated by the sensor 102 is the difference between the signals generated by the two MR elements $MR_1$, $MR_2$. As was the case with the system shown in FIGS. 2–4, the position information in the system shown in FIG. 5 is detected at the zero crossings of the differential signal $MR_1-MR_2$. Because the dual-MR system can be used to sense direction of rotation of the wheel 100, an arrow 105 is shown in FIG. 5 to represent, in the case shown, a clockwise rotation.

Figure 6:
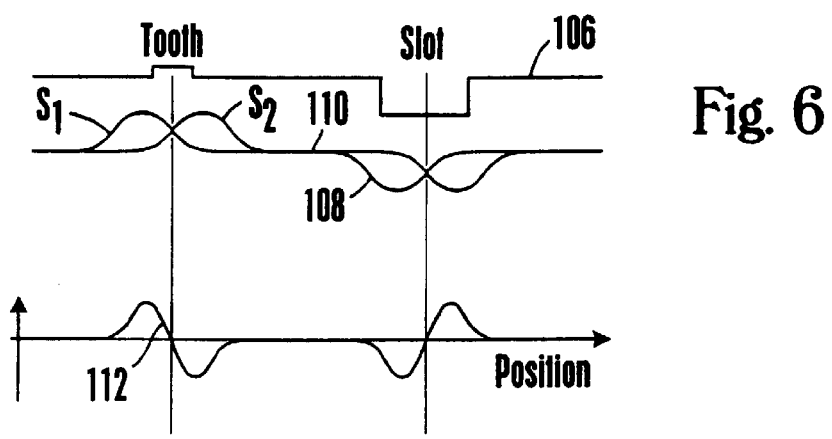
FIG. 6 is a graph of the signals generated by the sensor shown in FIG. 5, as a function of target wheel angular position.

FIG. 6 shows this with more specificity, assuming a clockwise rotation of the wheel 100. The top graph line 106 represents the periphery of the wheel 100 by showing a single tooth followed by a single slot. The middle graph line 108 shows the signals $S_1$, $S_2$ from the MR elements $MR_1$, $MR_2$, respectively, with the signals $S_1$, $S_2$ overlapping each other and being positive (relative to an average signal 110) when a tooth is sensed and overlapping and being negative when a slot is sensed. The bottom graph line 112 represents the differential MR signal. Comparing the middle and bottom graph lines 108, 112, it can be appreciated that when the differential signal crosses zero, the combined MR signals $S_1$, $S_2$ are above average (relative to the average signal 110) in the case of a tooth, whereas when the differential signal crosses zero, the combined MR signals $S_1$, $S_2$ are below average (relative to the average signal 110) in the case of a slot.

It is to be understood that in the dual-element MR system shown in FIGS. 5 and 6, when the wheel rotates clockwise as indicated the differential signal 112 for a tooth is negative after the zero crossing, and for a slot is positive after the zero crossing. On the other hand, when the wheel 100 rotates counterclockwise, the differential signal for a tooth is positive after the zero crossing, and for a slot is negative after the zero crossing. This fact can be coupled with the information shown in the middle graph line 108 to determine the direction of rotation of the wheel 100.

Figure 7:
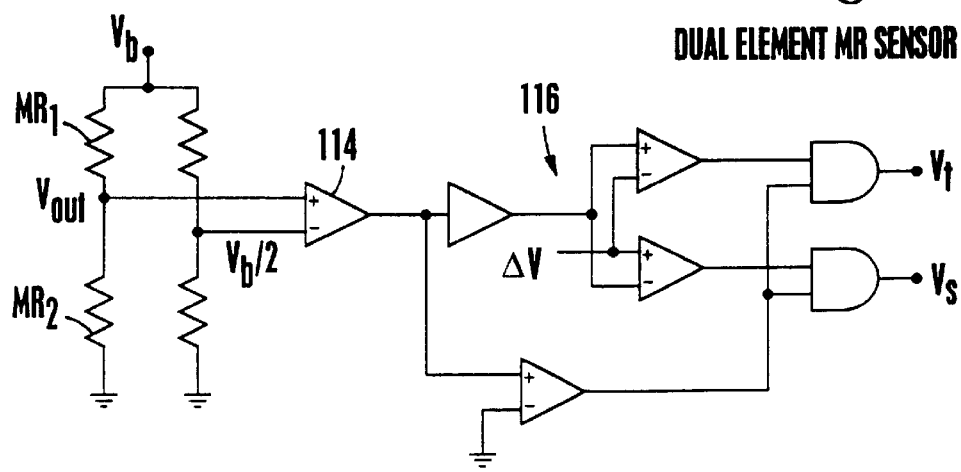
FIG. 7 is a schematic diagram of the electrical circuit used by the system shown in FIG. 5.

FIG. 7 shows a circuit that can be used to process the signals from the dual-element MR sensor system. As shown, the elements $MR_1$ and $MR_2$ are arranged in a voltage divider circuit and their output $V_{out}$ is subtracted from one-half of a supply voltage $V_b$ by a differential amplifier 114. As teeth and slots pass by the dual element MR sensor, the output of the differential amplifier 114 is a waveform that is qualitatively similar to the waveform of the VR sensor 28. Accordingly, the output of the differential amplifier 114 is sent to a remaining circuit 116 that is in all essential respects identical to the circuit shown in FIG. 4.

Figure 8:
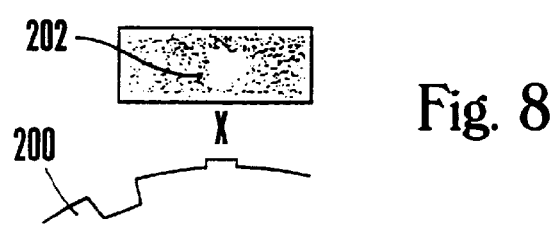
FIG. 8 is a schematic plan view of an alternate system showing a portion of a target wheel in juxtaposition with a single element MR sensor.
Figure 9:
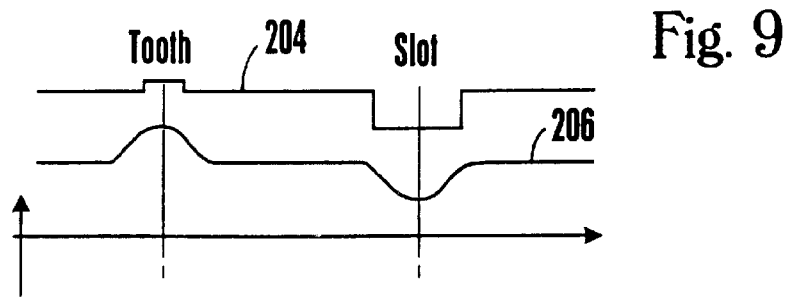
FIG. 9 is a graph of the signals generated by the sensor shown in FIG. 8, as a function of target wheel angular position.

FIGS. 8 and 9 show yet another embodiment having a wheel 200 that is in all essential respects identical to the wheel 10 shown in FIG. 2 but that is used in connection with one and only one single-element MR sensor 202. It can be appreciated in reference to FIG. 9 that the top graph line 204 corresponds to the periphery of the wheel 200, and the bottom graph line 206 corresponds to both the magnetic field and the sensor 202 signal generated in response to the tooth and slot. A circuit can be provided in which a valley detector detects a minimum and, hence, a slot, and a peak detector detects a maximum and, hence, a tooth.

Figure 10:
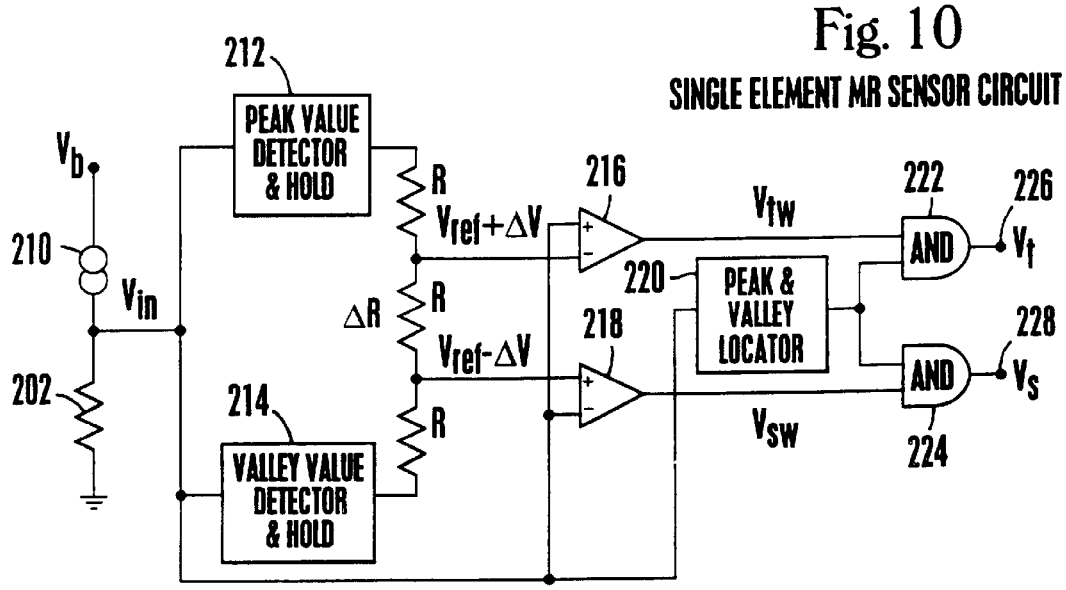
FIG. 10 is a schematic diagram of the electrical circuit used by the system shown in FIG. 8.

FIG. 10 shows a circuit that can be used to process the signals from the single-element MR sensor system. A source voltage $V_b$ is sent to a current source 210 that feeds the single-element MR sensor 202. The output signal of the sensor 202 is sent, as input signal $V_{in}$, to a peak value detector and hold circuit 212 and to a valley value detector and hold circuit 214. The circuits 212, 214 detect and hold, respectively, the values of the peak and the valley of $V_{in}$.

In continued reference to FIG. 10, the averages of the outputs of the detect and hold circuits 212, 214 are used by resistors R to generate a reference voltage $V_{ref}$, which is then added to a predetermined ?V voltage and sent to a tooth comparator 216. Also, the reference voltage $V_{ref}$ is subtracted from ?V and sent to a slot comparator 218. The comparators 216, 218 receive the output voltage of the sensor 202 (labelled "$V_{in}$" in FIG. 10) and compare their respective input signals to produce respective tooth and slot intermediate voltages $V_{tw}$ and $V_{sw}$. A peak and valley locator circuit 220, such as the circuit described in U.S. Pat. No. 4,835,467, incorporated herein by reference, receives $V_{in}$ and outputs its signal to tooth and slot AND circuits 222, 224. The tooth and slot AND circuits 222, 224 respectively receive the tooth and slot intermediate voltages $V_{tw}$ and $V_{sw}$ and combine these voltages with the output of the peak and valley locator circuit 220 to in turn output respective tooth and slot location signals $V_t$, $V_s$ at pins 226, 228 using principles set forth above in relation to FIG. 7.

While the particular BINARY ENCODED CRANKSHAFT TARGET WHEEL WITH SINGLE VR SENSOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A target wheel for ascertaining the angular position of a crankshaft, comprising:
   a disk-shaped wheel body having a periphery defining a nominal radial surface characterized by a nominal wheel radius, plural slot radial surfaces each being characterized by a slot radius less than the nominal wheel radius, and plural tooth radial surfaces each being characterized by a tooth radius greater than the nominal wheel radius, each slot radial surface defining a slot radial depth, each tooth radial surface defining a tooth radial height, the slot radial depth being greater than the tooth radial height; and
   one and only one sensor used in combination with the wheel body.

2. The target wheel of claim 1, wherein the slot radial surfaces and tooth radial surfaces are disposed around the periphery.

3. The target wheel of claim 1, wherein at least one slot defines a slot angular width and at least one tooth defines a tooth angular width, and the slot angular width is larger than the tooth angular width.

4. The target wheel of claim 3, wherein each slot defines the slot angular width and each tooth defines the tooth angular width.

5. The target wheel of claim 1, in combination with an engine crankshaft.

6. The target wheel of claim 5, in further combination with an engine.

7. An angular-based crankshaft position sensing system, comprising:
   a disk-shaped target wheel having plural slots and plural teeth defining a binary pattern, each tooth defining a tooth angular width and a tooth radial height, each slot defining a slot angular width and a slot radial depth, the tooth angular width being less than the slot angular width and the tooth radial height being less than the slot radial depth such that each tooth is shorter and narrower than each slot; and one and only one VR sensor juxtaposed with the target wheel and responsive to the binary pattern to generate a signal representative of the position of the target wheel.

8. The system of claim 7, in combination with an engine crankshaft.

9. The system of claim 8, in further combination with an engine.

10. A crankshaft target wheel, comprising:

a disk-shaped wheel body having a nominal periphery, plural teeth rising from the nominal periphery, and plural slots falling from the nominal periphery, each tooth defining a tooth angular width and a tooth radial height, each slot defining a slot angular width and a slot radial depth, the tooth angular width being less than the slot angular width and the tooth radial height being less than the slot radial depth; and one and only one sensor used in combination with the wheel body.

11. The target wheel of claim 10, wherein the sensor is a VR sensor.

12. The target wheel of claim 10, in combination with an engine crankshaft.

13. The target wheel of claim 10, in combination with an engine.

14. A crankshaft position sensing system, comprising:

disk-shaped wheel means coupled to a crankshaft for rotating therewith, the disk-shaped wheel means establishing plural teeth and plural slots, each tooth being shorter and narrower than each slot; and one and only one angular position sensing means for sensing the position of the wheel means and generating a signal representative of the position of the crankshaft.

15. The target wheel of claim 1, wherein the sensor is a VR sensor.

16. The target wheel of claim 1, wherein the sensor is a magnetostatic sensor.

* * * * *